United States Patent [19]

Scola et al.

[11] 3,720,536

[45] March 13, 1973

[54] TREATMENT OF CARBON FIBERS

[75] Inventors: Daniel A. Scola, Glastonbury; Malcolm Basche, West Hartford, both of Conn.

[73] Assignee: United Aircraft Corporation, West Hartford, Conn.

[22] Filed: June 18, 1970

[21] Appl. No.: 47,489

[52] U.S. Cl. ............117/47 R, 117/47 H, 117/106 R, 117/118, 117/228, 8/115.6, 8/140, 264/DIG. 19, 423/447

[51] Int. Cl. ......B44d 1/092, B44d 5/12, C01b 31/07
[58] Field of Search ...23/209.1; 8/115.5, 115.6, 140; 117/47 R, 47 H, 106 R, 118, 228; 264/DIG. 19

[56] References Cited

UNITED STATES PATENTS

| | | | |
|---|---|---|---|
| 3,304,148 | 2/1967 | Gallagher | 8/140 |
| 2,062,370 | 12/1936 | Miller | 117/47 H |

FOREIGN PATENTS OR APPLICATIONS

1,194,176  6/1970  Great Britain......................23/209.1

Primary Examiner—William D. Martin
Assistant Examiner—M. Sofocleous
Attorney—John D. Del Ponti

[57] ABSTRACT

A method of treating carbon fiber to improve its bonding characteristics in a resin matrix comprising heating the fiber to 1,000° –1,500° C and exposing the heated fiber to an atmosphere consisting essentially of nitrogen and 0.1–1.8 percent, by volume, of oxygen for a period of 0.1–60 seconds.

3 Claims, 7 Drawing Figures

TREATMENT OF CARBON FIBERS

BACKGROUND OF THE INVENTION

This invention relates to carbon fibers of the type suitable for use as a reinforcement in a composite material and more particularly relates to a method of treating carbon fiber to improve its bond with the supporting matrix in a composite material.

High modulus high strength carbon and graphite yarns, having an ultimate tensile strength of at least $100 \times 10^3$ psi and a Young's modulus of at least $16 \times 10^6$ psi, because of certain unfavorable surface characteristics, do not bond strongly to resins such as those suitable for use in applications of the aerospace industry, e.g. the epoxy or polyimide resins. The bond of such fibers to the resins has characteristically been poor, typically yielding graphite fiber-resin matrix composites with low shear strengths; generally in the range of 3,500–4,500 psi for low fiber content composites (20–45 vol percent) and below 3,500 psi for high fiber content composites (45–65 vol percent).

While it has been suggested to surface treat carbon fibers in order to improve their shear strength by various methods, such as for example, oxidation, the resulting degradation of other fiber properties, especially tensile strength, has been a problem, particularly when dealing with relatively high treatment temperatures of 1,000° C and higher.

SUMMARY OF THE INVENTION

The present invention relates to the high temperature treatment of carbon fiber in a continuous process wherein the surface of the fiber is activated at a rapid rate with no deterioration of the desirable filament properties. As used herein, the term carbon fiber relates to flexible carbon or graphite filamentary material available in any elongated textile form such as yarns, braids, felts etc. or in monofilament form.

In accordance with this invention a resistively heated carbon fiber is exposed, at high temperature, to a particular atmosphere of nitrogen and oxygen for less than one minute. Experiments have shown that in order to treat a fiber at temperatures of 1,000° – 1,500° C and achieve a surface which will provide a strong bond to resin, without degrading the fiber, the nitrogen atmosphere must contain oxygen in an amount limited to the range of 0.1–1.8 volume percent with a reactor residence time limited to 0.1–60 seconds.

Carbon-resin composites fabricated with carbon fibers treated according to the present invention exhibited a high resistance to shear failure while maintaining high flexural strengths.

BRIEF DESCRIPTION OF THE DRAWINGS

An understanding of the invention will become more apparent to those skilled in the art by reference to the following detailed description when viewed in light of the accompanying drawings, wherein.

DESCRIPTION OF THE PREFERRED EMBODIMENT

The technique of treating carbon fibers according to the present invention comprises heating carbon fibers in a nitrogen atmosphere having a limited oxygen concentration at such a temperature and for a limited period of time such as to activate the fiber surface with little or no concomitant degradation in fiber properties. The treatment has been found to increase the specific surface area of the fiber nearly threefold; raising it from 0.87 m²/g to 2.4 m²/g.

The heat treatment takes place in a nitrogen atmosphere containing 0.10–1.8 percent, by volume, of oxygen at high temperatures, from 1,000° to 1,500° C, and for contact periods ranging from 0.1 to 60 seconds. Exceptional results obtain when the temperature is maintained at 1,200° – 1,300° C, the contact time at 1.7–6.7 seconds and the oxygen concentration at 1.8 percent.

Figure 1:
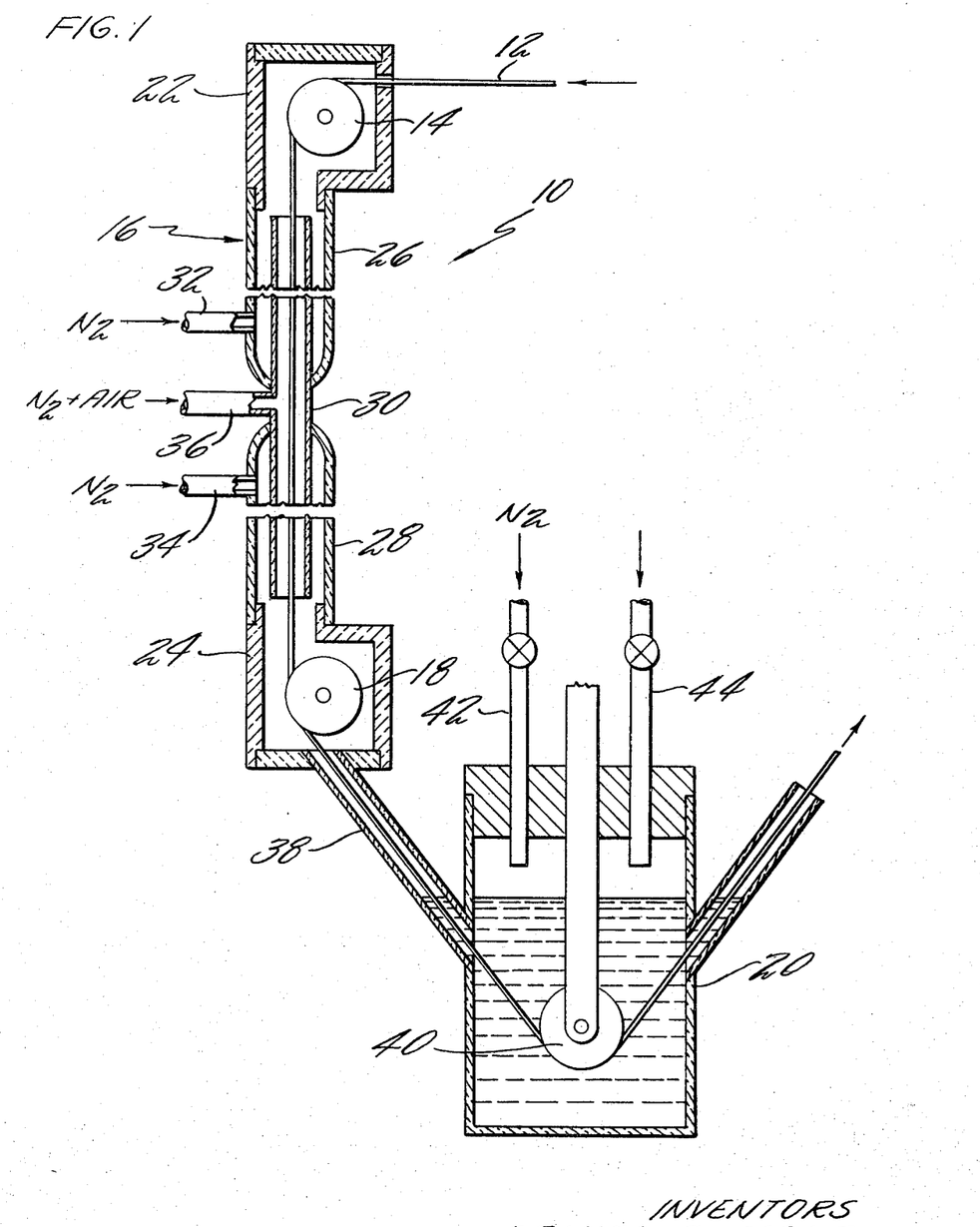
FIG. 1 illustrates the apparatus used in the practice of the fiber treatment process.

In the process, the apparatus designated generally as 10 in FIG. 1 was utilized. A continuous length of carbon fiber 12, emanating from a suitably supply roll (not shown) was passed over a first graphite guide roll 14, downwardly through a vertical double wall Pyrex reactor 16, past a second graphite guide roll 18 and into a resin-containing pot 20. As will be appreciated by those skilled in the art, the first and second guide rolls 16 and 18 are located within upper and lower graphite housing electrodes 22 and 24 respectively in order to cause resistance heating to the fiber segment therebetween. As shown, the electrodes 22 and 24 are in sealing engagement with the upper and lower ends of outer reactor tubes 26 and 28 respectively which surround inner reactor tube 30. The outer tubes 26 and 28 are each provided with a nitrogen inlet 32, 34 while the inner tube 30 is provided with a single centrally located inlet 36 for the ingress of a nitrogen-air mixture.

In practice, the yarn was coated immediately after treatment by passage through a resin solution in an atmosphere of nitrogen. An isolating tube 38 extends between the lower electrode 24 and the resin pot 20 in order to prevent exposure of the treated fiber to the air prior to resin coating. The resin pot is provided with a teflon coated guide pulley 40, a nitrogen purge tube 42 and a resin fill tube 44.

After passage through the resin pot 20, the resin coated yarn is wound onto a take-up drum (not shown) preferably in tape form. The resin impregnated tapes can then be "B" staged in the conventional manner, cut up into appropriate size and laid up into a multilayered composite to give a desired orientation, for example, 0°; 0°, 90°; or 0°, 90°45° fiber orientation. The composite is then cured. For epoxy matrix composites, satisfactory treatment comprises curing for 2 hours at 100° C at 100 – 200 psi with post curing for 2 hours at 150° C or first pressing to constant volume at 80° C followed by curing for 2 hours at 100° C and post curing for 2 hours at 150° C. For polyimide matrix composites, satisfactory treatment comprises curing for one hour at 700° F at 4,000 psi with post curing for 10 hours at 650° F.

During experimentation, apparatus such as that shown in FIG. 1 was utilized. The reactor measured 24 inches between electrodes and incorporated an inner tube 30 of three-eighths inch diameter and outer tubes 26 and 28 of seven-eighths inch ID. The nitrogen utilized was commercially available high purity nitrogen. Commercially available Thornel 50 yarn and Hitco HMG–50 graphite yarn of rayon, origin, along with a graphite yarn of polyacrylonitrile origin, were passed through the reactor and into a pot 20 containing epoxy resin according to the parameters shown in Table I.

Figure 3:
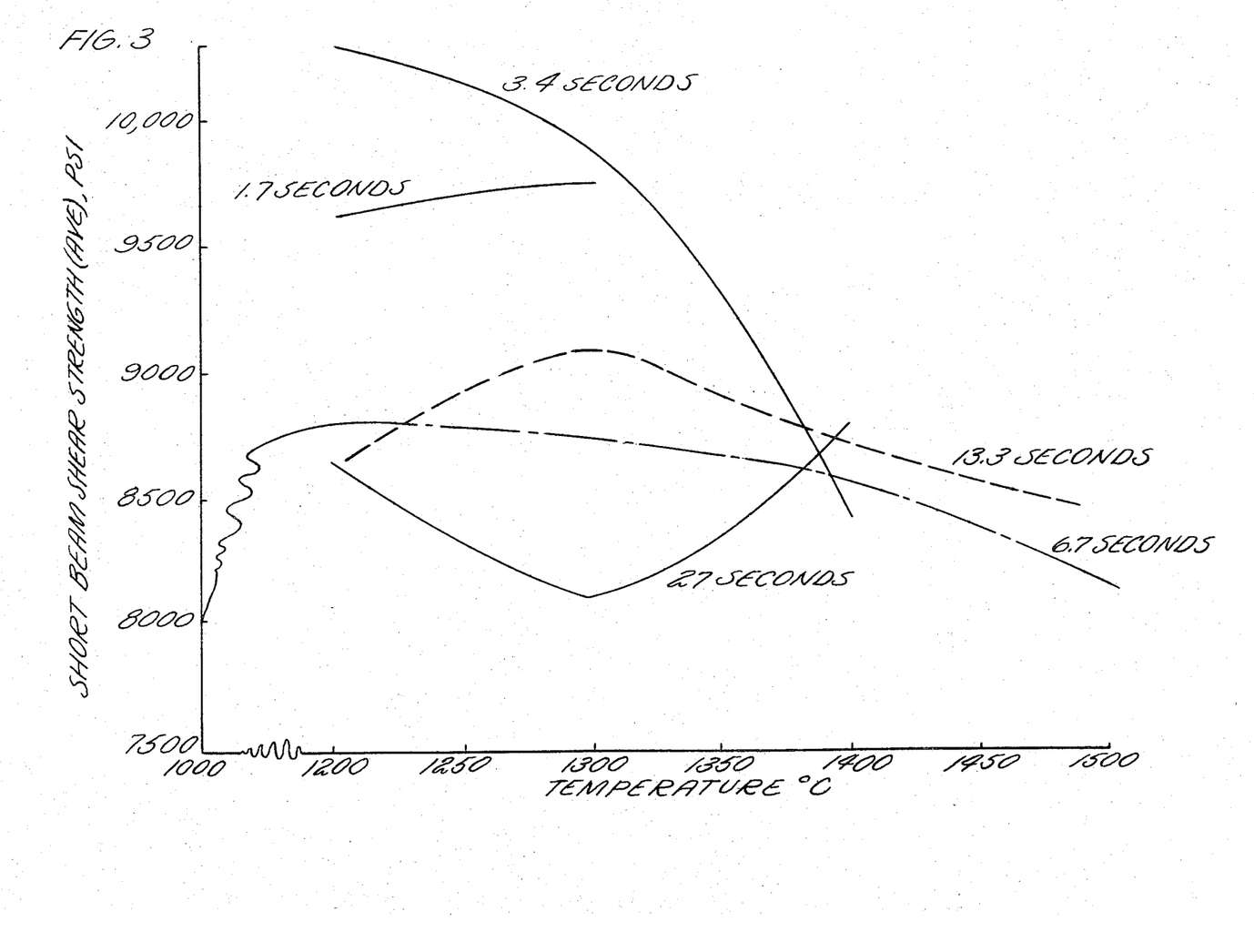
FIG. 3 is a graph illustrating the effect of temperature on shear strength.
Figure 4:
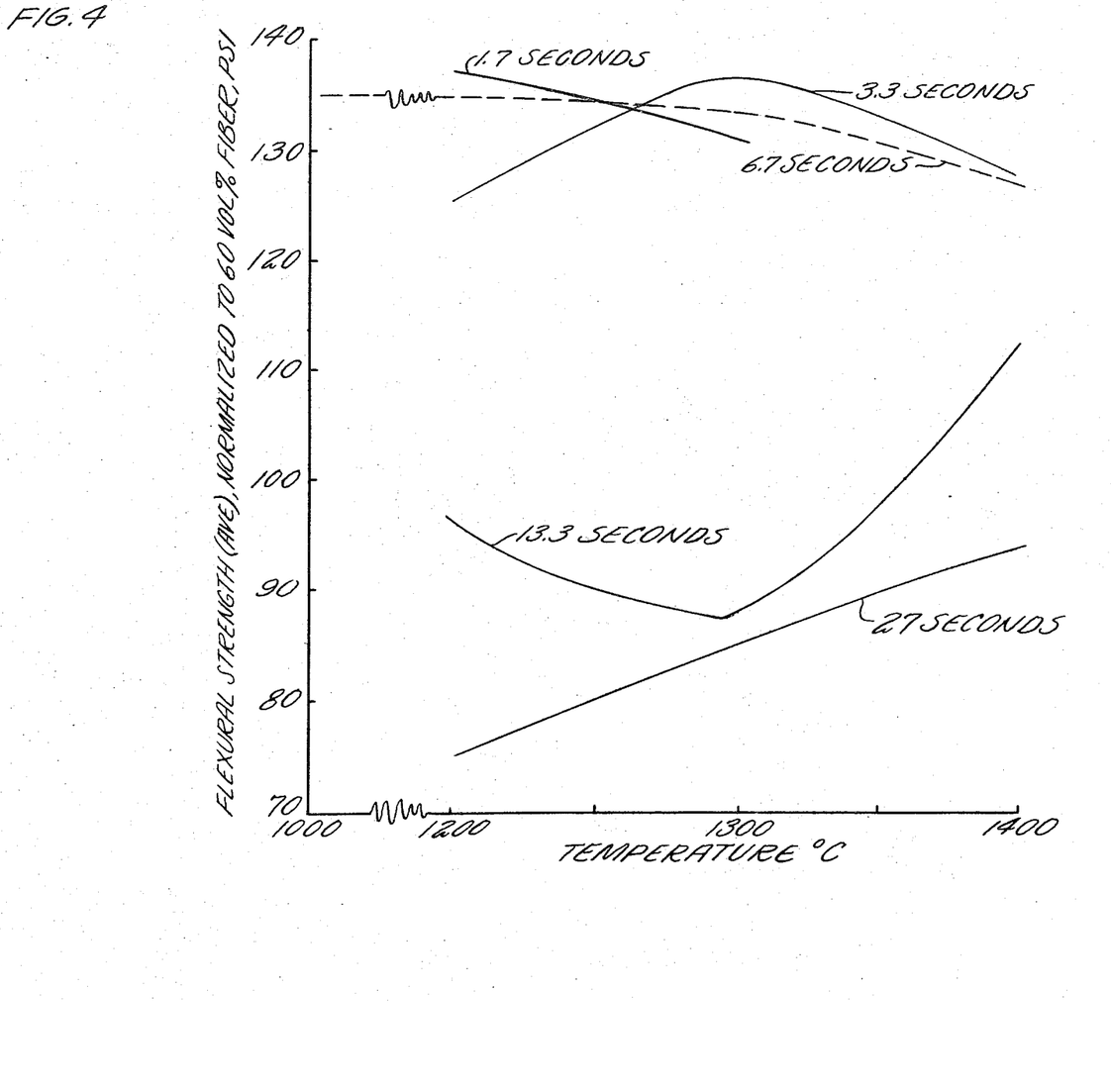
FIG. 4 is a graph illustrating the effect of temperature on flexural strength.

In FIG. 3, the effect of temperature on short beam shear strength is shown. The graph is based on HMG–50 graphite yarns unidirectionally reinforcing 2,256–0,820 epoxy resin at a fiber volume of 52 percent and with an oxygen concentration of 1.7 mol percent. Composites tested had a S/D=5/1. FIG. 4 is based on the same composite materials and oxygen concentration as FIG. 3 and shows the effect of temperature on flexural strength. The composites had an S/D=20/1 and were tested by the four point flex test method.

Other investigations were made with the oxygen concentration maintained at 1.8 percent using Hitco HMG–50 with the results as illustrated in Table II.

TABLE I

Graphite fiber—Epoxy resin composites

| Composite No. | Yarn (size) | Treatment | Contact time, sec. | Short beam shear strength, p.s.i., S/D=5/1 | Flexural prop. Strength 10³ p.s.i. | Flexural prop. Modulus 10⁶ p.s.i. | Fiber content, v/o | Density, g./cc. |
|---|---|---|---|---|---|---|---|---|
| 1 | T–50 (H₂O) | None | | 3,760 | 66.1 | 11.2 | 33 | 1.370 |
| 2 | T–50 (H₂O) | do | | 2,980 | 63.1 | 16.3 | 48 | 1.430 |
| 3 | T–50 (H₂O) | do | | 2,600 | 76.1 | 20.6 | 62 | 1.475 |
| 4 | T–50 (PVA) | do | | 3,760 | 63.8 | 13.6 | 39 | 1.410 |
| 5 | T–50 (PVA) | do | | 4,250 | 74.9 | 16.6 | 42 | 1.390 |
| 6 | T–50 (PVA) | do | | 4,770 | 89.1 | 17.3 | 54 | 1.416 |
| 7 | HMG-50 | Nitrogen at 1,200° C | 28 | 6,270 | 97.2 | 19.0 | 55.0 | |
| 8 | HMG–50 | do | 28 | 6,673 | 91.7 | 18.1 | 47.5 | |
| 9 | HMG–50 | Nitrogen at 1,300° C | 6.7 | 6,600 | 102.0 | 22.7 | 51.4 | 1.446 |
| 10 | HMG–50 | Nitrogen at 1,200° C | 6.7 | 7,060 | 88.3 | 19.2 | 41.8 | 1.439 |
| 11 | HMG–50 | do | 6.7 | 6,900 | 87.5 | 20.3 | 45.5 | 1.449 |
| 12 | HMG–50 | Nitrogen at 1,300° C | 3.3 | 6,550 | | | | |
| 13 | T–50 (PVA) | .94% O₂ in nitrogen 1,200° C | 28 | 7,570 | 78.8 | 16.9 | 42 | 1.421 |
| 14 | T–50 (PVA) | 1.2% O₂ in nitrogen 1,200° C | 28 | 7,230 | 82.4 | 20.4 | 55 | 1.436 |
| 15 | T–50 (PVA) | 1.8% O₂ in nitrogen 1,000° C | 28 | 7,260 | 84.1 | 19.6 | 48 | 1.440 |
| 16 | T–50 (PVA) | 1.8% O₂ in nitrogen 1,200° C | 28 | 7,408 | 88.9 | 20.6 | 38 | 1.456 |
| 17 | T–50 (PVA) | 1.8% O₂ in nitrogen 1,500° C | 28 | 7,503 | 99.9 | 21.0 | 38 | 1.400 |
| 18 | T–50 (PVA) | .94% O₂ in nitrogen 1,200° C | 14 | 7,639 | 84.9 | 17.4 | 47 | 1.419 |
| 19 | T–50 (PVA) | .94% O₂ in nitrogen 1,000° C | 14 | 6,700 | 77.1 | 20.7 | 52 | 1.450 |
| 20 | T–50 (PVA) | .47% O₂ in nitrogen 1,200° C | 56 | 7,450 | | | 52 | 1.450 |
| 21 | HMG–50 | 0.43% O₂ in nitrogen 1,300° C | 6.7 | 7,320 | 110.0 | 25.9 | | |
| 22 | HMG–50 | 0.43% O₂ in nitrogen 1,400° C | 6.7 | 8,635 | | | | |
| 23 | HMG–50 | 0.85% O₂ in nitrogen 1,200° C | 6.7 | 7,150 | | | | |
| 24 | HMG–50 | 0.85% O₂ in nitrogen 1,300° C | 6.7 | 7,980 | | | | |
| 25 | HMG–50 | 1.7% O₂ in nitrogen 1,300° C | 6.7 | 9,460 | | | | |
| 26 | HMG–50 | 1.8% O₂ in nitrogen 1,400° C | 13.3 | 5,550 | | | | |

TABLE II

Graphite Fiber-Epoxy Resin Composites
1.8% oxygen in nitrogen

| Composite number | Graphite yarn (no sizing) | Temp., °C. | Contact time, seconds | Short beam shear strength, Ave.* (p.s.i.) | Flexural properties Strength 10³p.s.i. | Flexural properties Modulus 10⁶p.s.i. | Fiber vol., percent | Density, g./cc. |
|---|---|---|---|---|---|---|---|---|
| 406 | HMG–50 | | (*) | 4,540 | 79.4 | 24.1 | 51.8 | 1.420 |
| 613 | HMG–50 | 1,200 | 6.7 | 8,440 | 115.7 | 21.9 | 52.1 | 1.452 |
| 615 | HMG–50 | 1,300 | 6.7 | 9,460 | 124.1 | 21.9 | 53.5 | 1.456 |
| 630 | HMG–50 | 1,200 | 3.3 | 10,619 | 112 | 24.8 | 54.3 | 1.488 |
| 623 | HMG–50 | 1,300 | 3.3 | 10,200 | 124.1 | 23.7 | 53.7 | 1.487 |
| 633 | HMG–50 | 1,200 | 1.7 | 9,550 | 125 | 25.1 | 50.5 | 1.469 |
| 412 | HMG–50 | 1,000 | 28 | 8,025 | 84.8 | 24.0 | 54.1 | 1.476 |
| 415 | HMG–50 | 1,200 | 28 | 4,757 | 81.1 | 26.3 | 66.0 | 1.497 |
| 421 | HMG–50 | 1,500 | 28 | 9,266 | 114.6 | 24.1 | 60.7 | 1.501 |

ᵃ No treatment.
* Span to depth 5/1.

It should be noted that those yarns which were treated with nitrogen only, although showing strength improvements over untreated yarns, deactivate readily upon exposure to air whereas those subjected to the nitrogen-oxygen treatment do not. Further, it should also be understood that the maximum oxygen content of 1.8 percent by volume is considered critical. Inclusion of more than 1.8 vol percent will result in fiber degradation.

Figure 2:
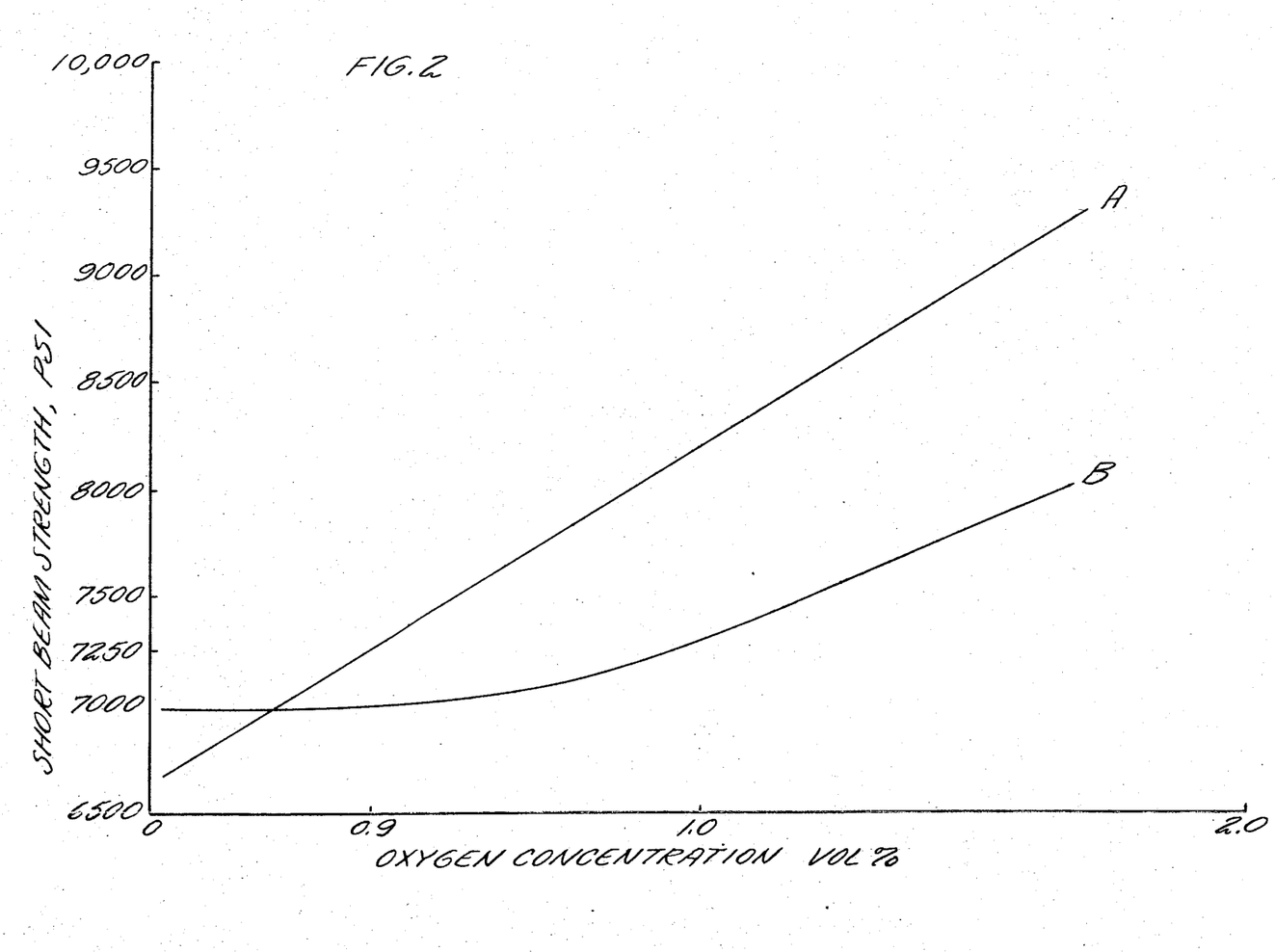
FIG. 2 is a graph illustrating the effect of oxygen concentration on shear strength.

The effect of oxygen concentration on short beam strength is shown in FIG. 2. Plot A is for a contact time of 6.7 seconds at 1,300° C while plot B is for a contact time of 6.7 seconds at 1,200° C.

Figure 5:
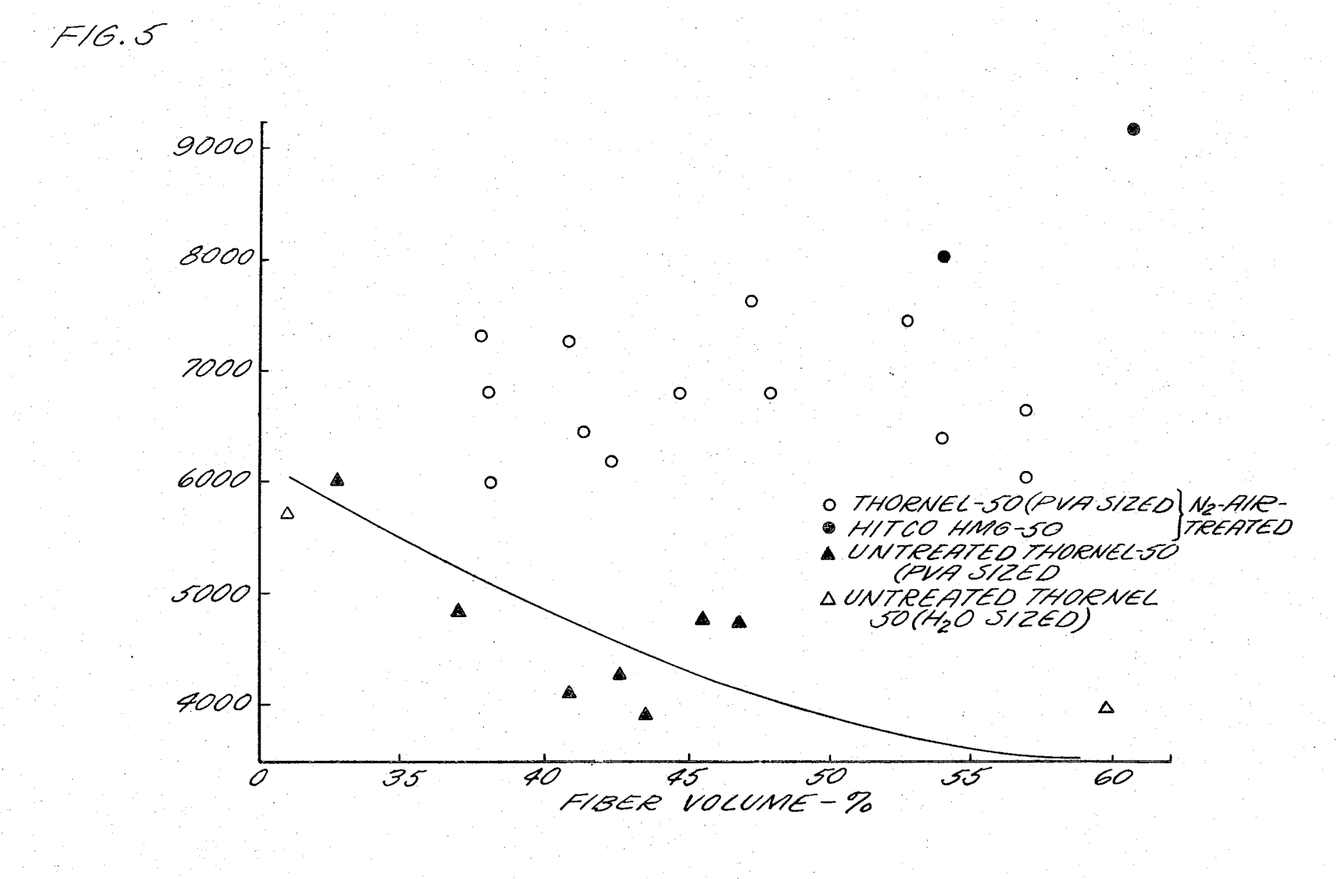
FIG. 5 is a graph illustrating the effect of fiber content on shear strength.
Figure 6:
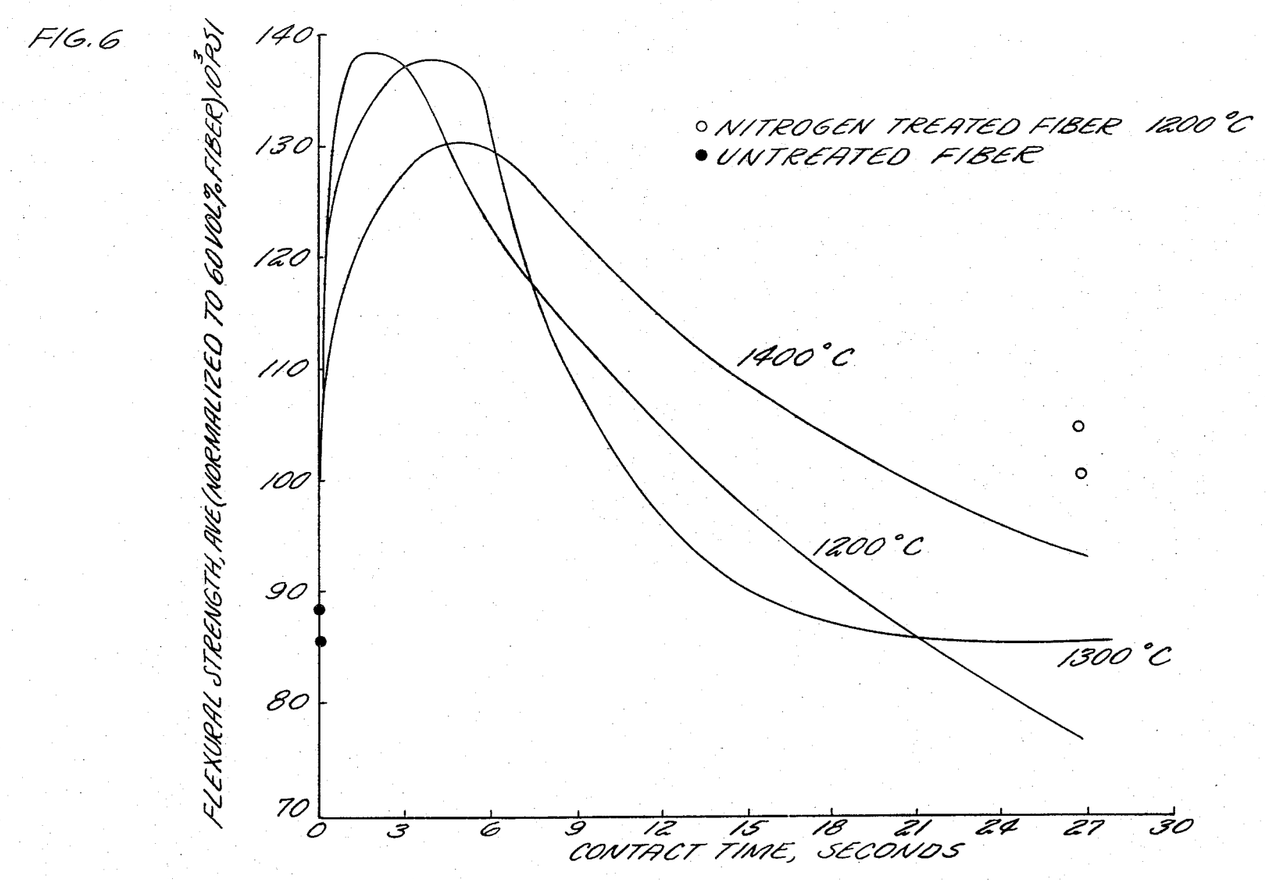
FIG. 6 is a graph illustrating the effect of contact time on flexural strength.
Figure 7:
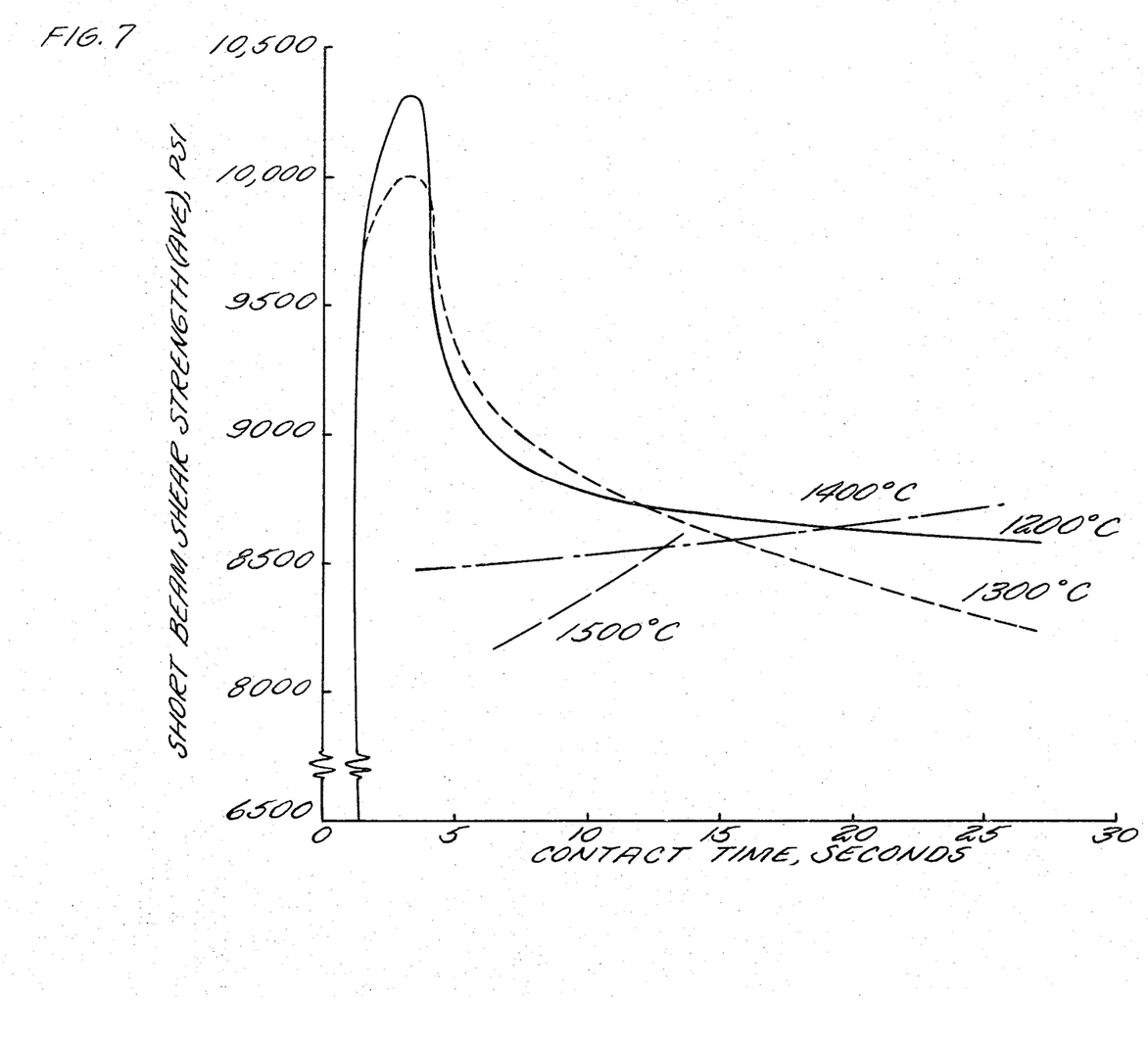
FIG. 7 is a graph illustrating the effect of contact time on shear strength.

In FIG. 5, the effect of fiber volume on short beam shear strength is shown for carbon fibers unidirectionally reinforcing 2,256–0,820 epoxy resin and having an S/D=5/1. FIG. 6 shows the effect of contact time on flexural strength and is based on the same composite material and oxygen concentration as FIG. 3. The composites has an S/D=20/1 and were tested by the four point flex test method. The same materials and oxygen concentration pertains to FIG. 7, except where otherwise indicated, wherein the effect of contact time on shear strength is shown. The specimens tested all had a fiber volume of 52 percent and an S/D=5/1.

It will be noted that by the present method there is provided a continuous process for activating the graphite surface with little or no degradation of the fiber properties. It is seen for example, that the graphite-resin composites prepared thereby can achieve, on a reproducible basis a significantly higher shear failure (up to 9,000–10,000 psi) and flexural strength (up to 120,000–130,000 psi at 60 v/o fiber) as compared to similar composites made with untreated fibers (shear of 4,500 psi and flexural strength of 90,000 psi). Since flexural strengths are considered a valid indicator of fiber tensile properties, it will be appreciated that the increase in flexural strength indicates that there has been no lessening in the fiber tensile properties.

What has been set forth above is intended primarily as exemplary to enable those skilled in the art in the practice of the invention and it should therefore be understood that, within the scope of the appended claims, the invention may be practiced in other ways than as specifically described.

We claim:

1. A method of improving the bonding characteristics of carbon fiber to a resin matrix without causing significant degradation in mechanical properties of the fiber comprising heating the fiber to a temperature of 1,000° to 1,500° C, exposing the heated fiber to a nitrogen atmosphere for a period of time of from 0.1 to 60 seconds, said nitrogen atmosphere containing oxygen in the range of from 0.10 through 1.8 percent by volume, and bonding said fiber to a resin matrix.

2. The method of claim 1 wherein the fiber is heated to a temperature range of 1,20°–1,300° C.

3. The process of claim 2 wherein the heated fiber is exposed to a nitrogen atmosphere containing an oxygen concentration of 1.8 percent, by volume, for a period of 1.7 – 6.7 seconds.

* * * * *